United States Patent [19]
Oka et al.

[11] 3,990,726
[45] Nov. 9, 1976

[54] INFLATABLE AND SEMI-CRUSHABLE SAFETY BAG FOR VEHICLE PASSENGER

[75] Inventors: Takashi Oka, Tokyo; Hirokazu Mitsuhashi, Yokohama; Hiroshi Iwasaki, Kamakura, all of Japan

[73] Assignees: Nissan Motor Co., Ltd.; Ikeda Bussan Company, Limited, both of Japan

[22] Filed: Apr. 23, 1975

[21] Appl. No.: 570,570

[52] U.S. Cl. ............................ 280/739; 182/137; 280/743
[51] Int. Cl.² ........................................ B60R 21/08
[58] Field of Search ............. 182/137; 280/150 AB, 280/739, 743, 742

[56] References Cited
UNITED STATES PATENTS

| 3,451,693 | 6/1969 | Carey | 280/150 AB |
|---|---|---|---|
| 3,527,475 | 9/1970 | Carey | 280/150 AB |
| 3,573,885 | 4/1971 | Brawn | 280/150 AB |
| 3,586,347 | 6/1971 | Carey | 280/150 AB |
| 3,591,201 | 7/1971 | Brawn | 280/150 AB |
| 3,642,303 | 2/1972 | Irish | 280/150 AB |
| 3,752,501 | 8/1973 | Daniel | 280/150 AB |
| 3,758,133 | 9/1973 | Okada | 280/150 AB |
| 3,792,873 | 2/1974 | Buchner | 280/150 AB |
| 3,799,573 | 3/1974 | McDonald | 280/150 AB |
| 3,879,056 | 4/1975 | Kawashima | 280/150 AB |

*Primary Examiner*—M. H. Wood, Jr.
*Assistant Examiner*—John P. Silverstrim
*Attorney, Agent, or Firm*—Robert E. Burns; Emmanuel J. Lobato; Bruce L. Adams

[57] ABSTRACT

The bag has at least one rip which is normally sealed by sewing, adhesion or welding with a calculated strength so that the rip may open and relieve the bag pressure when the bag pressure exceeds a predetermined pressure due to collision of the passenger against the inflated bag. The open rip may be exposed to the atmosphere, but alternatively an inflatable auxiliary bag may be attached to the former bag in such an arrangement that the discharged gas is received in the auxiliary bag.

5 Claims, 7 Drawing Figures

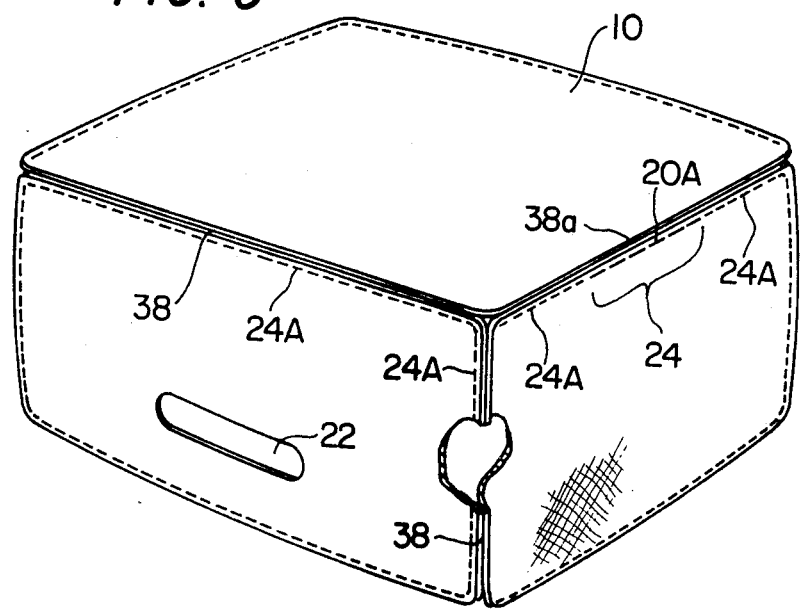
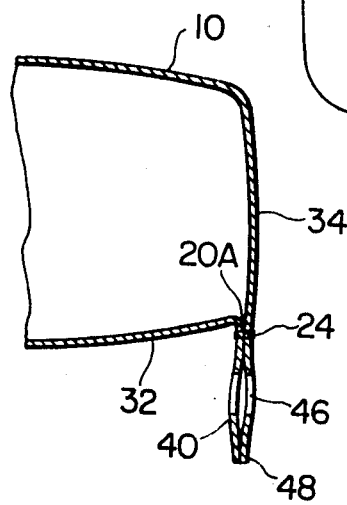
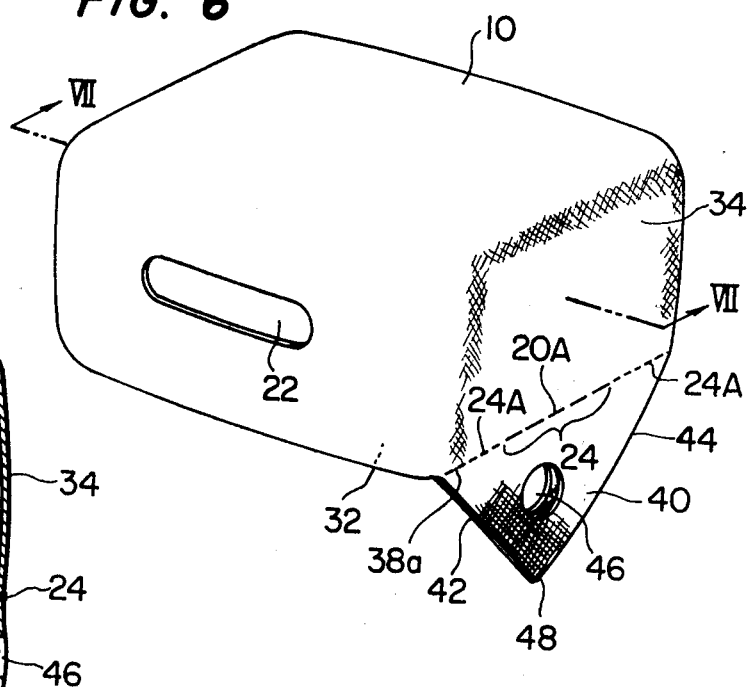

INFLATABLE AND SEMI-CRUSHABLE SAFETY BAG FOR VEHICLE PASSENGER

BACKGROUND OF THE INVENTION

This invention relates generally to a safety apparatus for protecting a vehicle passenger in a collision of the vehicle by inflating a bag against the passenger, and more particularly to an improved inflatable bag for such apparatus.

It is expected that apparatus comprising an inflatable bag as a main element thereof will occupy an important position in the field of safety measures for protecting passengers in various vehicles subject to impact, particularly in automobiles, in the near future. In a collision of the vehicle, the bag is rapidly inflated by a pressurized gas towards a passenger or seat occupant to provide cushion against an inertial movement of the occupant. Merits of such apparatus have been ascertained, but a problem remains unsolved. When the passenger bumps against the inflated bag, the bag repels the passenger with a considerable magnitude of force resulting from a sharp increase in the internal pressure of the bag.

Various means have been proposed until now to prevent a gas pressure in the bag from increasing excessively and protect the passenger from possible injuries due to repelling by the bag, but none of the prior art is considered fully satisfactory. A bag, for example, equipped with a relief valve which operates at a predetermined pressure has been proposed. In practice, however, a considerable dispersion is observed in the relieving pressure of the valve attached to the inflatable bag apart from a natural increase in the production cost. Also it has been proposed in regard to a bag of a wooven fabric to provide a specific region on the bag where the texture of the fabric is loosened in such a calculated manner as to give vent to the confined gas when the gas pressure in the bag exceeds a predetermined pressure. Although the provision of no extra valve means is necessary, this bag itself is not easy to produce and it is quite difficult to design an appropriate texture for realizing such a region and calculate an optimum area of the region. According to a still another method, it has been intended to cut open a bag locally with an edged tool which is arranged outside the bag such that the tool pierces the bag when the bag is bumped by a passenger and swerved. This method also has the disadvantage of an extremely complicated construction. In a slightly different but similarly purposed method, a plurality of needle holes are formed on a portion of a bag in a circular alignment. The bag material rips along the hole line and gives an opening at a critical bag pressure, but the critical pressure exhibits a considerably large dispersion in practical applications.

SUMMARY OF THE INVENTION

It is an object of the present invention to provide an inflatable bag for the described safety apparatus, which bag is simple in construction and constructed such that a maximum gas pressure in the inflated bag is accurately limited to a predetermined pressure.

It is another object of the invention to provide an inflatable bag for the described apparatus, which bag is constructed such that the gas pressure in the inflated bag drops gradually to a certain extent by discharge of a portion of the gas when the inflated bag collides against a separate object causing the gas pressure to exceed a predetermined pressure.

According to the invention, there is provided a safety device for the protection of a vehicle passenger, which device comprises an inflatable bag made of a flexible sheet material, which bag has a gas inlet port for receiving a pressurized gas for inflating the bag, at least one rip and sealing means to keep the rip closed until a gas pressure in the bag exceeds a predetermined pressure after the bag is inflated. The rip is arranged in such a way that a portion of the pressurized gas confined in the bag is discharged from the bag through the rip when the rip is open.

The rip according to the invention is preferably arranged in a straight line. The sealing means for the rip may be a joint formed by sewing, adhesion or welding of the sheet material along the rip.

When the passenger bumps violently against a bag according to the invention after the inflation thereof, a sharp increase in the bag pressure causes the rip to open so that the bag can be crushed to a certain extent and does not repel the passenger.

BRIEF DESCRIPTION OF THE DRAWINGS

Other features and advantages of the invention will become apparent from the following detailed description of preferred embodiments thereof with reference to the accompanying drawings, in which:

FIG. 5 is a perspective view, partly broken, of a differently modified bag as a third embodiment of the invention, FIG. 6 is a perspective view of a still differently modified bag as a fourth embodiment of the invention; and FIG. 7 is a fragmentary sectional view of the same bag taken along the line 7—7 of FIG. 6.

DESCRIPTION OF THE PREFERRED EMBODIMENT

Figure 1:
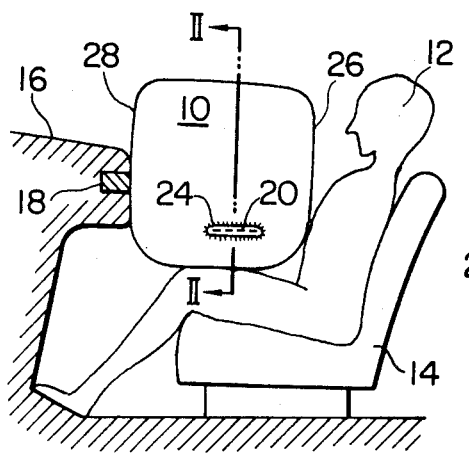
FIG. 1 is a schematic side view of an inflatable bag as a first embodiment of the invention, which bag is inflated to occupy a space between a dashboard of an automobile and a front seat occupant.
Figure 2:
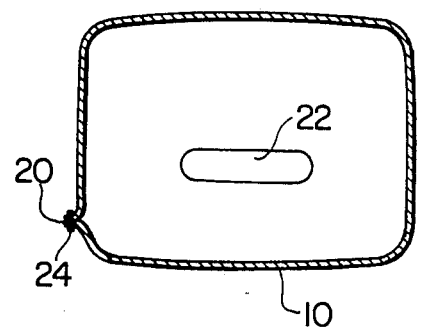
FIG. 2 is a sectional view of the same bag taken along the line 2—2 of FIG. 1.

FIGS. 1 and 2 show an inflatable bag 10 according to the invention which forms essential part of a safety apparatus installed on an automobile for protecting a passenger 12 in a front seat 14 against collision with a dashboard 16 in a collision of the vehicle. The bag 10 in FIG. 1 is already fully inflated by a pressurized gas supplied thereto from a gas generator 18 of the safety apparatus in response to a signal from an impact detector (not shown) of the apparatus. The bag 10 has a normally sealed rip 20 which opens when the passenger 12 moves forward by inertia and bumps against the bag 10, causing the gas pressure in the bag 10 to exceed a predetermined critical pressure, and allows a portion of the gas confined in the bag 10 to flow out. The provision of the normally sealed rip 20 is an essential feature of the inflatable bag 10 according to the invention. In other respects, the bag 10 is similar to conventional inflatable bags for safety apparatus of the illustrated type. The numeral 22 indicates a gas inlet port of the bag 10 which is shaped and arranged to fit with the gas generator 18. The bag 10 in this embodiment is shaped into a generally hexahedral box form, but may alternatively be shaped into any other form. The sheet material of the bag 10 also is not particularly limited by the provision of the rip 20. Almost every flexible sheet material which is practically gas impermeable and good for conventional inflatable bags for the described apparatus may be used. Some examples of practical materials are wooven fabrics, synthetic resin sheets, artificial leathers and various combinations of them.

The rip 20 is formed generally straight-lined not only for the sake of convenience in production but also for causing the sealed rip 20 to open always at a constant bag pressure. There is no particular restriction on the location nor the number of the rip 20; a single rip 20 as illustrated usually suffices for the intended gas discharge, but two or more rips 20 may be formed depending on the size, shape and/or expected inflation pressure of the bag 10.

The rip 20 is sealed by a seam 24, so that the bag 10 can be inflated like conventional safety bags without gas leakage when the gas is supplied thereto through the inlet port 22. If a forward movement of the passenger 12 exerts an impulsive load on the thus inflated bag 10 and causes the gas pressure in the bag 10 to exceed a predetermined pressure, the seam 24 opens and a portion of the gas confined in the bag 10 is discharged through the rip 20. The rip 20 is designed in its length and number in such manners that the gas pressure in the bag 10 remains at a level enough to prevent the bag 10 from being completely crushed. In other words, a face 26 of the bag 10 just opposite the passenger 12 is not allowed to come into contact with an opposite face 28 during the inertial forward movement of the passenger 12 after the seam 24 opens.

The rip 20 is sealed by sewing in this embodiment, but may alternatively be sealed by the application of an adhesive or by means of welding with, e.g., a high-frequency current if the material is a thermoplastic one: the choice is made mainly taking into consideration the material of the bag 10. When the bag 10 is made of a wooven fabric, it is usually profitable to seal the rip 20 by sewing, whether by hand or with machine, for attaining uniformity in a critical gas pressure at which the seam 24 or the rip 20 opens. A thread for sewing the seam 24 has preferably a tension between about 0.8 and about 25 kg, and the pitch of stitches for the seam 24 is preferably between about 7 and about 30 stitches per 5 cm.

Figure 3:
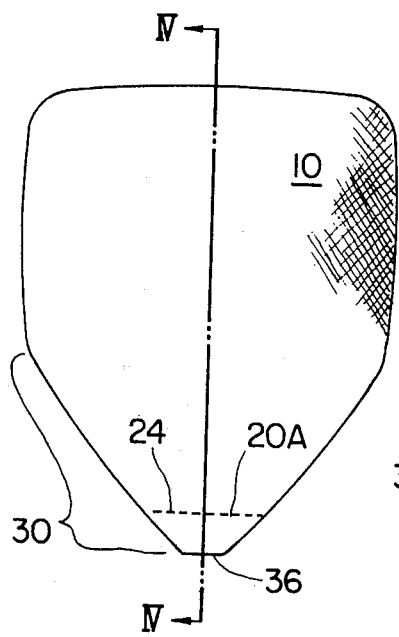
FIG. 3 is a side view of a slightly modified bag as a second embodiment of the invention.
Figure 4:
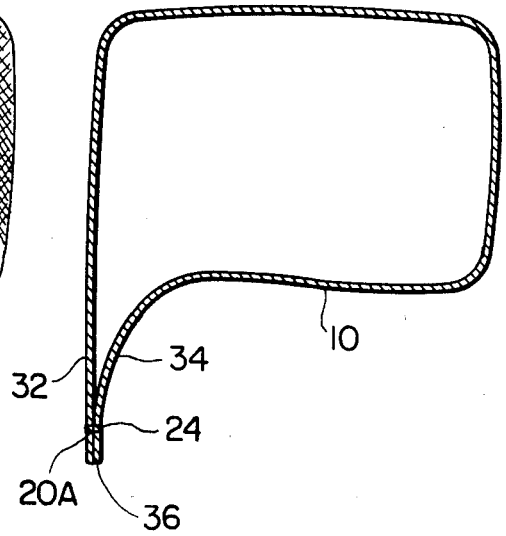
FIG. 4 is a sectional view of the same bag taken along the line 4—4 of FIG. 3.

The rip 20 is formed on a side of the bag 10 in the embodiment of FIGS. 1 and 2, but may alternatively be formed along an edge of the bag 10 as illustrated in the subsequent Figures. In FIGS. 3 and 4, showing a second preferred embodiment of the invention, the bag 10 is shaped to have a tongue-like extension 30, which is narrowed and thinned at the extending end thereof such that opposing two sides 32 and 34 of the bag 10 keep in close contact with each other at the end of this extension 30. In the thus shaped bag 10, the rip 10 can be obtained without cutting out the sheet material of the bag 10, but simply by leaving the two sides 32 and 34 unjoined with each other at the end of the extension 30. The naturally formed opening is utilized as a rip 20A according to the invention and is then sealed in a manner as hereinbefore explained. When the rip 20A is sewed up to give the seam 24, it will be convenient to shape the extension 30 in such a fashion that the seam 24, i.e., the rip 20A is located at a distance from a real end 36 of the extension 30. The two sides 32 and 34 must be left unjoined with each other at the end edge 36.

In FIG. 5, the bag 10 is formed hexahedral by sewing together generally rectangular six pieces of a flexible sheet material, so that each edge 38 of the bag 10 is sealed by a seam 24A. As a third preferred embodiment of the invention, the seam 24A is omitted along a portion of one (indicated at 38a) of the edges 38 such that the non-seamed portion serves as the rip 20A. The non-seamed portion of the edge 38a, i.e., the rip 20A, is sealed by the seam 24 which is different from the seam 24A for the remaining portions in the strength of the sewing thread and/or the pitch of the stitches. Anyhow, the seam 24 for the rip 20A is formed weaker than the seams 24A for forming the bag 10. Sometimes the edge 38a in its full length is sealed by the weaker seam 24 so that the rip 20A may have the same length as the edge 38a. Besides, two or more of the edges 38 may have each one rip 20A of this type.

An experiment was carried out to examine the dispersion of the critical bag pressure at which the seam 20A opens for the bag 10 of FIGS. 3 and 4. The bag 10 had a capacity of 190 liter, and the seam 24, i.e., the rip 20A, was 150 mm long. The seam 24 was formed by sewing the two sides 32 and 34 together with a nylon thread of No. 30 count, 140 denier/1 × 3 and at a sewing pitch of 17 stitches per 5 cm. The bag 10 was inflated with air until the internal gauge pressure reached 0.2 kg/cm². Then an impulsive external load was exerted on the bag 10 the magnitude of which load was increased stepwise until the seam 24 was caused to open. The experiment was performed with identical eight sample bags 10, and the critical pressures observed for the respective samples were as follows.

| Sample No. | 1 | 2 | 3 | 4 | 5 | 6 | 7 | 8 | Mean |
|---|---|---|---|---|---|---|---|---|---|
| Critical pressure ($kg/cm^2$, gauge) | 0.32 | 0.31 | 0.31 | 0.32 | 0.32 | 0.32 | 0.27 | 0.33 | 0.313 |

The dispersion of these data is far smaller than, i.e., about one-fourth of dispersions in similar tests for conventional inflatable bags.

In addition to a remarkable accuracy or uniformity in the critical pressure at which the gas pressure relieving occurs, the sealed rip 20 or 20A according to the invention has the advantages that the rip 20 can be formed easily and inexpensively and that the rip 20 can be designed variously in accordance with the desired magnitude of the critical pressure and/or extent of the pressure relieving. Especially when the rip 20 is sealed by sewing, such design modifications can be accomplished quite easily and at one's option since the modification can be accomplished by the choice of the strength of a sewing thread and/or the pitch of stitches for the seam 24.

Referring now to FIGS. 6 and 7, the bag 10 may be combined with an auxiliary inflatable bag 40, which inflates as the gas discharged from the bag 10 is received therein. Accordingly the auxiliary bag 40 causes the extent and/or rate of the pressure decrease in the bag 10 to vary depending on the capacity of the auxiliary bag 40. In the embodiment of FIGS. 6 and 7, the seamed rip 20A is formed along one (38a) of the edges 38 of the hexahedral bag 10 in the same way as in the case of FIG. 5. The auxiliary bag 40 is arranged so as to communicate with the main bag 10 only when the rip 20A is opened and exclusively through the rip 20A. In this example, the auxiliary bag 40 is formed by extending two sides 32 and 34 of the bag 10, which intersect at the edge 38a, and sewing them together along the extending edges 42 and 44. Thus the interior of the auxiliary bag 40 is normally partitioned from the interior of the main bag 10 by the sealed rip 20A. For example, a good result was obtained when the edge 38a was 650 mm in length and sewed up in the following manner. A 150 mm long middle portion, which served as the rip 20A according to the invention, was sewed up to form the seam 24 by a nylon thread of No. 30 count, 140 denier/1 × 3, and at a needle pitch of 17 stitches per 50 mm. The remaining portions were seamed by another nylon thread of No. 5 count, 120 denier/2 × 3 and at the same pitch of stitches. The auxiliary bag 40 has a gas discharge hole 46 of an adequate area so that a portion of the received gas is discharged into the atmosphere. Alternatively, an extending end 48 of the auxiliary bag 40 may be cut off to form an opening. However, the provision of neither the hole 46 nor such an opening is needed when the auxiliary bag 40 has a comparatively large capacity. As another alternative of the hole 46, the auxiliary bag 40 may have a normally sealed rip like the main bag 10, which rip opens when the gas pressure in the auxiliary bag 40 reaches a predetermined pressure.

What is claimed is:

1. A safety device for the protection of a vehicle passenger in collision of the vehicle, the device comprising, an inflatable bag having a gas inlet port for receiving a pressurized gas for inflating said bag, said bag consisting of a plurality of polygonal pieces of a flexible sheet material, said polygonal pieces being sewed up together along every side thereof along seams so that said bag in the inflated state has the shape of a polyhedron, said seams being disposed along the respective edges of the polyhedron, at least a predetermined one of said seams having a weaker strength than others of said seams, said weaker strength being such that said predetermined one of said seams opens and defines a rip for discharging a portion of said pressurized gas from said bag when the gas pressure in said bag exceeds a predetermined pressure after said bag is inflated.

2. A safety device according to claim 1, in which said seams comprise sewn seams having threads, and in which said predetermined one of said seams comprises a weaker thread than said others of said seams.

3. A safety device according to claim 1, in which said seams comprise sewn seams having threads, and in which said predetermined one of said seams comprises thread stitches larger than thread stitches of said others of said seams.

4. A safety device as claimed in claim 1, further comprising an auxiliary inflatable bag which is joined with said inflatable bag in an arrangement with the interior of said auxiliary bag normally partitioned from the interior of said inflatable bag by said weaker seam so that the interior of said inflatable bag communicates with the interior of said auxiliary bag through said seam when said seam is open thereby to cause said portion of said pressurized gas to be received in said auxiliary bag, said auxiliary bag having an opening of such an area that a portion of the received gas is discharged from said auxiliary bag.

5. A safety device as claimed in claim 4, wherein said auxiliary bag has a seam to keep said opening closed until a gas pressure in said auxiliary bag exceeds a second predetermined pressure after said auxiliary bag is inflated.

* * * * *